United States Patent Office 2,948,191
Patented Aug. 9, 1960

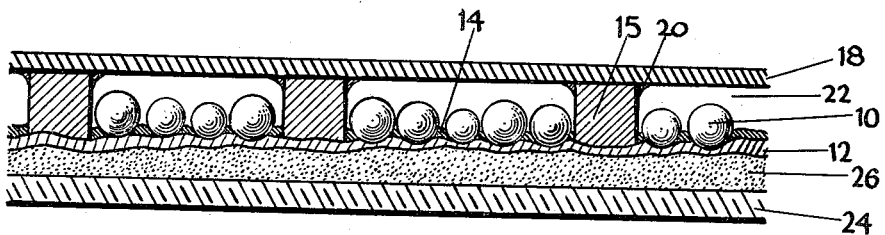
Fig. 2
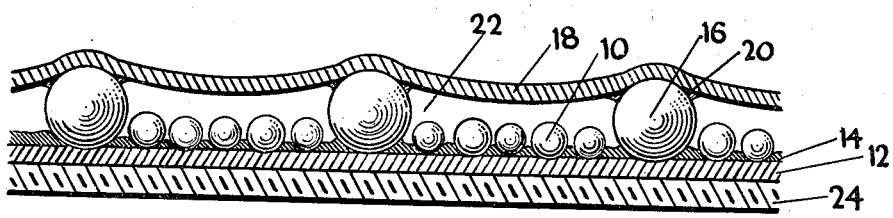
Fig. 3
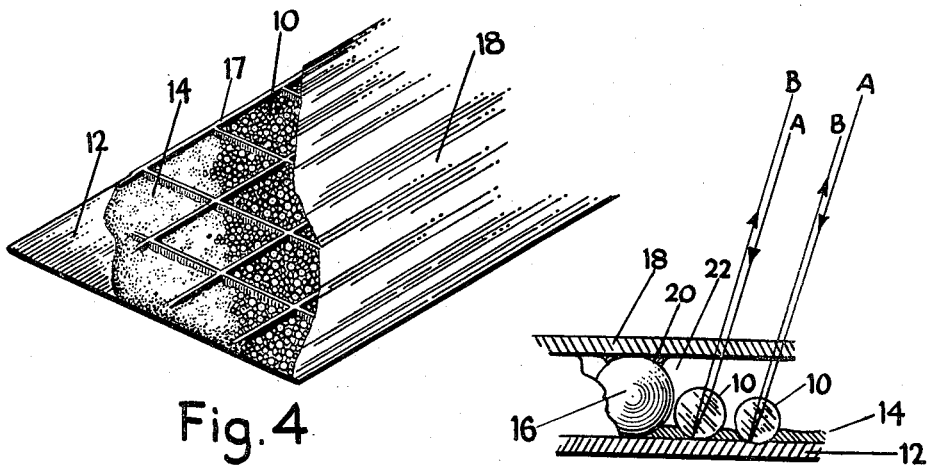
Fig. 4
Fig. 1

2,948,191
RETROREFLECTING SURFACE

George T. Hodgson, Jr., Melrose, and Robert C. Wells, Bedford, Mass., assignors, by mesne assignments, to Cataphote Corporation, Toledo, Ohio, a corporation of Ohio Filed June 6, 1956, Ser. No. 589,751

5 Claims. (Cl. 88—82)

This invention relates to surfaces capable of retroreflecting light and more particularly to a novel arrangement of glass beads suitable for forming such light-reflecting surfaces.

The term retroreflection is hereinafter used to designate a reflective surface or area which will reflect an incident beam or ray of light in such a manner that a brilliant cone of light, such as might come from an automobile headlight, is selectively returned to the source even though the incident light strikes the reflecting surface at an angle. Thus the term distinguishes this type of reflection from that achieved by a mirror which gives a specular reflection and from a diffusing surface which diffuses or dissipates the incident light in all directions.

Reflectors of the retroreflecting type are generally employed where the incident beam strikes a reflecting surface which is otherwise in partial or total darkness. In particular, retroreflecting surfaces are used on highway marking signs and advertising signs. In such cases, it is absolutely essential that the reflection is transmitted back to the source of the incident light, even though the incident light may strike the reflecting surface at an angle. In the case of highway marking signs it is also necessary that a maximum amount of brilliancy is retained so that the sign may be visible from a suitable distance and may be clear enough to avoid any possible misinterpretation of its meaning.

Retroreflecting surfaces, as now made and used, are of two general types. The first or older type consists of glass beads, serving as spherical lenses, partially embedded in a diffusely reflecting, white base layer filled with white pigment which serves both as the adhesive and the reflecting surface. The second, or newer type, consists of spherical bead lenses embedded in a colorless organic binder and having a more-or-less specularly reflecting metal surface placed in the binder or adjacent to it so that a definite and predetermined distance between the glass beads and the metal surface is maintained. This distance is critical and is required in order to attain proper focusing of the bead lenses according to the refractive index of the glass beads. (See for example U.S. Patents 2,294,930, 2,354,018, and 2,407,680.)

In both of these types of retroreflecting surfaces, the lens effect of the beads depends not only on the refractive index of the bead but also on the refractive index of the medium surrounding it, which may be used both as an adhesive to fix the bead in place, and as a coating over the upper, exposed portion of the bead. In fact, a term which may be referred to as an effective refractive index of a glass bead partially or wholly embedded in a transparent organic binder may be defined as the refractive index of the glass divided by the refractive index of the binder. Since the commonly-used organic binders suitable for this application exhibit refractive indices of the order of 1.4, it means that a glass bead having a refractive index of 1.9 embedded in such a binder and depending upon the binder to serve as a focal point would have an effective refractive index of 1.9/1.4 or about 1.4. Decreasing the refractive index increases the focal length of the glass bead lens and this situation can only be corrected in the case of the second type of reflectors described by increasing the distance from the glass bead to the metal surface and hence increasing the amount of plastic binder, or by using glasses having refractive indices above 2. Since the manufacture of glass having a refractive index of 2 or greater is difficult and expensive, only the solution of increasing the binder layer thickness appears feasible.

In the case of the first type of retroreflectors described, the decrease in effective refractive index detracts markedly from the brilliance attained since the diffusion is materially increased, which, when considered in connection with the spherical aberrations inherent in the glass beads, means a very ineffective reflector of the type sought. In this type of retroreflector the efficiency of reflection depends on the reflectivity of the base pigment which is normally low. Moreover, the pigment shows a tendency to diffuse light rather than reflect it, and usually the reflecting surface is not at the focal point of the beads attached to it. The simultaneous requirements that the binder possess good adhesion for the glass beads and be reflective severely limits the choice of a suitable base paint for the first type of retroreflector now in use.

The critical conditions which must be met in achieving good performance from the second type of retroreflectors now used, and particularly the requirement that a predetermined distance must be maintained between the glass beads and the metal reflector, means that this type of retroreflector can be made and marketed only as a composite sheet built up of layers of closely controlled properties. Hence, this type of coating or retroreflecting surface cannot be applied in situ on existing signs, or on surfaces, such as rough or corrugated areas, where it is impractical or impossible to apply a fairly rigid sheet. Furthermore, the degree of "angularity" (defined as the ability of the retroreflector to maintain brilliancy at increasing angles of incidence) depends to some extent on the spacing between the beads and the reflecting layer of metal. A large increase in angularity can be obtained only at the expense of brilliance.

In addition, beaded surfaces which are not smoothed off by filling in the depressions formed by the beads' curved surfaces can have their effectiveness as retroreflectors materially decreased by mud, dust, and dirt deposited on them. Since highway signs cannot be continuously wiped off because of the maintenance costs, it is very desirable to have a retroreflecting surface which is efficient and at the same time smooth. Such a smooth surface is less conductive to dirt and dust build-up and permits rain to wash off any harmful accumulations of dirt from the retroreflecting surface.

From the above discussion of the two general types of retroreflectors now in use, it may be seen that it would be desirable to have a retroreflecting surface which was unaffected by the relatively high refractive index of an organic binder or of a pigment-binder layer, and which could achieve a wide variation in angularity without a corresponding sacrifice in reflectivity or brilliance. It would also be desirable to have a reflector of this type which may be applied in situ, i.e., on signs, road markers, etc., which means it would be free of the stringent manufacturing controls and the necessity of being applied as a sheet material.

It is therefore an object of this invention to provide a retroreflecting surface made up of glass beads attached to an area by means of an adhesive, the index of refraction of which has no influence upon the beads' performance as retroreflectors.

It is another object of this invention to provide a retroreflecting surface which has no predetermined distances between the beads and a reflecting surface. The attainment of this object means that such retroreflectors may be satisfactorily made without stringent manufacturing control, and that increased angularity may be attained without undue loss of brilliance. It is a further object, in view of the elimination of such manufacturing control, to provide a retroreflecting surface which may be applied in situ. It is still a further object to provide such a surface which may be applied in situ to bases, signs, etc., which are difficult or impossible to make retroreflecting by affixing a fairly rigid sheet which is a prepared retroreflecting surface.

It is another object of this invention to provide a retroreflector which is not dependent upon or adversely affected by the relatively high index of refraction of the ordinary organic binders used to hold the glass beads in place. It is still another object to provide retroreflectors the performance of which is determined by the refractive index of only the glass beads and which is therefore reliable and predictable.

It is an additional object to provide retroreflecting surfaces which are smooth, and which, because of their smoothness, are much less susceptible to dirt accumulation because of their proximity to highways. It is still an additional object to provide this smooth surface without loss of retroreflecting efficiency.

It is a further object of this invention to provide a retroreflector which makes possible the use of specular reflectors of high efficiency.

These and other objects will become apparent in the following description of the retroreflector of this invention.

The improved performance of the retroreflector of this invention is obtained by the use of glass beads, of the desired refractive index, which are contacted on one side by a reflective material and on the opposite side by a layer of air. A thin transparent film is stretched over the exposed surface and means are provided for holding the transparent covering film in a fixed position with respect to the beads and reflective material. The covering film may be permanently attached at certain anchoring points which rise above the level of the retroreflecting beads in such a manner as to leave the air layer which may be of monomolecular dimension between the retroreflecting beads and the smooth surface thus created by the transparent film. The air layer having a refractive index of 1.0 means that effective refractive index of the retroreflecting glass beads is not decreased.

The practice of this invention may now be more fully set forth with regard to the accompanying drawings in which:

Fig. 1 is a much enlarged cross-sectional view of a section of a retroreflecting surface showing the manner in which incident light is reflected;

Fig. 2 is a much enlarged cross-sectional view of a section of one type of retroreflecting surface made in accordance with this invention;

Fig. 3 is a much enlarged cross-sectional view of a section of another type of retroreflecting surface made in accordance with this invention; and Fig. 4 is a plan view, partially in cut-away representation, of the retroreflecting surface of this invention.

In Fig. 1, the retroreflecting beads 10 are held in contact with a reflecting material 12 by means of a suitable adhesive 14. An anchoring point is here supplied by a bead 16 having a diameter greater than any of the retroreflecting beads 10. Anchoring bead 16 is affixed to reflecting material 12 on one side and to transparent covering film 18, by means of adhesive 20, on the opposite side. The transparent film thus stretched from anchoring point to anchoring point creates a smooth over-all surface and at the same time leaves a layer of air 22 over retroreflecting beads 10. Incident light, such as represented by beams A, passes through film 18, and through air layer 22, without deflection to outer retroreflecting bead 10. Beads having relatively high indices of refraction and acting as a lens will have focal points near to or at their points of contact with reflecting material 12. The incident light will then be reflected in beam B, parallel or almost parallel to beam A. Thus it is that only the refractive index of the retroreflecting beads need be considered.

The maintaining of a layer of air above the retroreflecting beads thus permits the use of the beads at their maximum efficiency, i.e., highest effective refractive index, and under optimum conditions, while the film used to maintain the air layer above the retroreflecting beads furnishes a smooth surface which will remain relatively free of dirt and which will be more effectively washed by rain than if the beads were uncovered or otherwise not smoothed over.

Figs. 2 and 3, in which like numbers refer to like elements in Fig. 1, illustrate two possible variations in the retroreflecting surface of this invention. Thus, in Fig. 2 the reflecting material 12 is affixed to a supporting sheet 24 by means of an adhesive material 26. The retroreflecting beads 10 are placed against the reflecting material 12 with sufficient pressure to cause the reflecting material to partly conform to the bottom sections of the retroreflecting beads. Adhesive 14 fills in the small voids between the beads. By forcing the reflecting material to conform to the bottom portion of the retroreflecting beads an extended portion of the surface area of each bead is in contact with the reflecting material, and a larger reflecting area is available to reflect the incident light than if the beads contacted the reflecting material at a point. By thus maintaining a larger reflective surface at the focal point of the individual retroreflecting beads, a greater degree of angularity is achieved for the retroreflecting surface. In the modification illustrated in Fig. 2, the film 18 is affixed in proper relationship to beads 10 by being attached to anchoring network 15.

In Fig. 3, the retroreflecting beads are contacted with reflecting material 12, the adhesive filling in the small spaces between the beads. The covering film 18 may be stretched tight as shown in Fig. 2 or may be permitted to sag between anchor points as in Fig. 3. This sagging may be permitted as long as the film 18 does not optically touch the retroreflecting beads 10.

The anchoring points may be in the form of a mesh 15 in Fig. 2 or of a larger bead 16 in Fig. 3. Any other suitable arrangement which permits the film to be raised sufficiently above the beads to provide the required air layer may be acceptable to the practice of this invention. Thus, for example, a grid work or mesh may be laid down and affixed to the reflecting material and the retroreflecting beads placed and permanently adhered to the reflecting material in the mesh openings. This, of course, requires that the mesh openings be equivalent to at least several diameters of the retroreflecting beads and that the material making up the mesh be somewhat larger in cross-section than the bead diameter. Since the grid work or mesh supplying the anchoring points for the covering film does not enter into the optics of the final retroreflecting surface, it may be of any suitable material such as, for example, vinyl screening, nylon screening, coarsely-woven fabrics such as cheese cloth, metal screening, or the like. As pointed out, the mesh size will be determined with regard to the size of the retroreflecting beads used.

Another way in which the anchoring points for the covering film may be supplied is to mix beads with diameters considerably greater than the diameters of the retroreflecting beads with the retroreflecting beads so that a sufficient number is present and adequately distributed to supply the necessary anchoring points. Such anchoring beads are illustrated in Fig. 3. If it is desired to distribute the larger anchoring beads throughout the retroreflecting surface area in a geometrical pattern a temporary pattern may be laid down, the retroreflecting beads affixed in the intervening areas, and then the temporary pattern removed. The larger, anchoring beads may then be affixed in the pattern area. The use of a slow-working adhesive may be preferred in this type of retroreflective surface formation. Since the larger anchoring beads, like the material from which a grid or mesh is made, do not enter into the optical performance of the final retroreflecting surface they may be of any suitable material. For creating an over-all uniform surface it may be preferable to use transparent anchoring beads.

Although the air layer between the top portions of the retroreflecting beads and the covering film need be only of molecular thickness, practical considerations such as construction, possibility of some film sagging or stretching and the like, indicate that the anchoring devices such as grid work or anchoring beads should usually be somewhat higher than that required to provide for several molecular thicknesses of air. It has been found preferable in most applications to provide anchoring points which extend about three retroreflecting bead diameters above the reflecting material. This allows for an air layer with an average depth of about two retroreflecting bead diameters and provides sufficient flexibility to permit the retroreflecting beads to vary in diameter. However, the diameters of the anchoring beads may conveniently range from about 1.5 to 4 times the diameter of the retroreflecting beads.

Although generally the anchoring points, as pointed out, are preferably raised above the retroreflecting beads, the requirement that only a monomolecular layer of air need be present between the covering material and the retroreflecting beads means that anchoring beads do not have to be any larger in diameter than the retroreflecting beads. Thus the covering film may be affixed to a small percentage of beads, leaving the remaining or major portion of the beads unattached to the covering film. Then, unless actual optical contact is maintained between retroreflecting bead and covering film, there will be present the necessary monomolecular layer of air above the unattached beads. One means by which such a retroreflecting surface may be made would be to mix in with the retroreflecting beads, anchoring beads covered with a thermoplastic material. By applying heat to the covering film the covered beads could then be affixed to the covering film. The covering film should be other than a thermoplastic material, or a material having a fusion point above that of the bead covering.

In the process of this invention glass beads ranging in size from about 2 to about 40 mils in diameter may be used as the retroreflecting beads. The heights of the anchoring points are adjusted according to the diameters of the retroreflecting beads. The use of such a wide range of bead diameter is possible because the performance of these beads is independent of an intervening binder layer, the thickness of which must be adjusted according to the bead diameter, i.e., the greater the bead diameter, the thicker must be the binder layer. This adjustment is eliminated in this invention by virtue of the fact that the retroreflecting beads are made to contact the reflecting surface directly. It is preferable, however, that for any one surface the beads have diameters which do not vary by more than a factor of about 2 or 3.

Since the effective refractive index of the retroreflecting beads is the actual refractive index of the glas from which the beads are formed, and is not modified by the refractive index of the organic binding or adhesive medium or the protective film covering them, the index of refraction of the beads may vary somewhat. However, the closer the refractive index of the glass approaches 1.89, the more efficient will be the resulting retroreflector since, when the refractive index is 1.89, the focus of the incident light is directly on the surface of the sphere and consequently on the reflecting material at the point of bead contact. Since, however, the spherical aberrations inherent in these beads mean that there will always be a slight deviation in the return path of the incident light, some deviation from this optimum refractive index can be tolerated. Although optimum performance is attained by using beads having an index of refraction of 1.89, beads having indices of refraction as low as about 1.7 are suitable for the practice of this invention. Likewise, beads having refractive indices greater than 1.89 are suitable. However, the cost of such beads may be excessive for many applications of retroreflecting surfaces.

Likewise, with the interposing of the layer of air between the covering film and upper portions of the retroreflecting beads, there can be no detraction from or modification of the index of refraction of the beads because of this top surface.

Although this invention is described in terms of glass beads, it is to be understood that the retroreflecting beads do not have to be glass. Any solid, transparent material capable of being formed into approximately spherical shapes having the required refractive index may be used.

It is necessary that a high percentage of the retroreflecting beads actually contact the reflecting material with little or no adhesive material being between them at the point of contact. As pointed out, it is preferable to force the retroreflecting beads against the reflecting material so that, if flexible, it is made to contact the beads over a portion of the beads' lower surfaces.

The reflecting material may be a thin sheet of highly reflecting metal such as aluminum foil or may be a coating placed on a base surface. The choice of reflecting material will be primarily determined with regard to the degree of flexibility desired, the ease of handling, and the like.

The cover film to be stretched over the retroreflecting beads and affixed to the anchoring points may be of any suitable transparent material exhibiting good light transmission, among which may be listed as illustrative, but not as limiting, films of a polyester (such as sold under the trade name "Mylar", cellulose acetate, polyvinylidene chloride, polyethylene, cellophane, nylon, and the like. The thickness of film will depend upon the amount of outside pressure it must withstand and the strength of the film material. For example, "Mylar" films ranging from about 1 to 2.5 mils thick have been found satisfactory. The film may be colorless or may be colored.

Because the adhesive used to fix the retroreflecting beads and the anchoring network into place on the reflecting surface is not involved in the optical performance of the final retroreflecting surface, it may be any suitable adhesive or binder, either transparent or not. Since the components, i.e., grid work or anchoring beads and retroreflecting beads, are conveniently affixed to the reflecting surface in steps, it is preferable to use a relatively slow-setting adhesive. Thus pressure-sensitive adhesives, delayed tack, or heat-sensitive adhesives are suitable. It is also feasible to use tacky solutions of such well-known organic binders as cellulose acetate and polyvinyl acetal film and such materials as tar, rubber cement, or paint and paint-like materials.

A number of adhesives or binders are also suitable for affixing the covering film to its anchoring points (such as a grid or large beads scattered throughout or in a pattern). Many such adhesives will occur to those skilled in the art, and since the adhesive does not enter into the optical performance of the retroreflecting surface, its optical properties need not be considered. It is preferable, however, to keep the quantity of adhesive used to a minimum to prevent its interfering with the passage of the incident light beam through the covering film. If a covering film of a thermo-plastic material is used, it may be found unnecessary to use any additional adhesive or binder, for the application of heat may be sufficient to cause the film to seal tightly at the anchoring points or areas. Likewise, the anchoring beads may be of a thermoplastic material or coated with a thermoplastic material. The application of heat to the covering film will then activate the thermoplastic material to achieve the necessary bonding.

This invention may be further described by an example illustrating one typical way of making a retroreflective surface using glass beads for the retroreflecting beads and a vinyl screening as the grid work to furnish the anchoring points for the cover film which was polyethylene with an average thickness of about 2 mils. The example will be presented with reference to Fig. 4.

A sheet of aluminum foil 12 (about 1 mil thick) was coated with a thin coat of tacky solution of epoxy adhesive 14 and was then covered with a vinyl screening 17. After the screening was pressed into place, glass beads 10 having an average diameter of about 4 mils and an index of refraction of 1.9 were deposited on the screen covered aluminum foil so that they filled the areas between the grid work of the screen. These glass beads were pressed down against the aluminum foil 12 so that contact was made between them and the foil, the adhesive being forced to occupy the spaces between the beads. Excess beads were removed by lightly brushing them off. The polyethylene film was then lightly stretched over the vinyl screening and heat applied for a short period just long enough to seal the polyethylene to the screening. The resulting retroreflective surface reflected an incident beam of light back to the light source and exhibited efficiencies comparable to or better than those of the two types of retroreflecting surfaces described as typical of the present art.

The smooth surface of the polyethylene film (or any other such film) offers little chance for the accumulation of highway dust or mud which is bound to be sprayed or splashed against highway signs; and that which is accumulated is more easily washed off by the intermittent rains. Moreover, this advantage of cleaner signs and markings is attained without loss of efficiency of the sign or marker to reflect back incident light to the source of that light. As shown in the above discussion, the retroreflecting surface of this invention may be easily made, either as a prefabricated surface which may be applied where desired, or it may be made in situ. Furthermore the retroreflective surface of this invention can be made using any desired adhesive and transparent cover film since these elements do not enter into the optical characteristics of the final retroreflecting surface.

We claim:

1. A substantially smooth, retroreflecting area, comprising a reflecting material, retroreflecting beads in close relationship to one another, and in fixed contacting relationship to said reflecting material, a flexible transparent film ranging in thickness from about 1 to 2.5 mils overlying and substantially coextensive with said reflecting material, and means for maintaining said transparent film in fixed relationship to said reflecting material and out of contact with and unattached to a major portion of said retroreflecting beads, said means including a plurality of anchoring points distributed over the area of the said reflecting material and being of sufficient height to provide a layer of air of at least molecular thickness between said transparent film and said retroreflecting beads.

2. The invention defined in claim 1 wherein said means for maintaining said transparent film in fixed relationship to said reflecting material and out of contact with and unattached to a major portion of said retroreflecting beads comprises a vinyl screening network.

3. The invention defined in claim 1 wherein said means for maintaining said transparent film in fixed relationship to said reflecting material and out of contact with and unattached to a major portion of said retroreflecting beads comprises a plurality of beads having a diameter from approximately 1.5 to 4 times the diameter of the diameter of said retroreflecting beads.

4. The invention defined in claim 1 wherein said flexible transparent film is colored.

5. The invention defined in claim 1 wherein the index of refraction of said retroreflecting beads ranges from 1.7 to 2.0.

References Cited in the file of this patent

UNITED STATES PATENTS

| | | |
|---|---|---|
| 722,847 | Jumeau | Mar. 17, 1903 |
| 1,093,498 | Thring | Apr. 14, 1914 |
| 1,649,708 | Large et al. | Nov. 15, 1927 |
| 1,670,327 | Tobener | May 22, 1928 |
| 1,959,090 | Wood | May 15, 1934 |
| 2,143,946 | Hunter | Jan. 17, 1939 |
| 2,377,508 | Michaels | June 5, 1945 |
| 2,379,741 | Palmquist | July 3, 1945 |
| 2,407,680 | Palmquist et al. | Sept. 17, 1946 |
| 2,421,277 | Luce | May 27, 1947 |